US012737545B2

(12) United States Patent
Ross et al.

(10) Patent No.: US 12,737,545 B2
(45) Date of Patent: Sep. 15, 2026

(54) LENGTH-BASED LARGE LANGUAGE MODELS

(71) Applicant: Ford Global Technologies, LLC, Dearborn, MI (US)

(72) Inventors: Lucas Ross, Royal Oak, MI (US); Diana Mann, Herndon, VA (US)

(73) Assignee: Ford Global Technologies, LLC, Dearborn, MI (US)

( * ) Notice: Subject to any disclaimer, the term of this patent is extended or adjusted under 35 U.S.C. 154(b) by 215 days.

(21) Appl. No.: 18/659,098

(22) Filed: May 9, 2024

(65) Prior Publication Data

US 2025/0348675 A1 Nov. 13, 2025

(51) Int. Cl.
*G06F 40/284* (2020.01)

(52) U.S. Cl.
CPC .................................. *G06F 40/284* (2020.01)

(58) Field of Classification Search
CPC .................................................... G06F 40/284
See application file for complete search history.

(56) References Cited

U.S. PATENT DOCUMENTS 11,295,081 B1 * 4/2022 Federico .............. G06F 40/284
2021/0286951 A1 9/2021 Song et al.
2022/0138239 A1 * 5/2022 Saito .................... G06N 3/0475 704/9
2022/0366140 A1 * 11/2022 Saito ....................... G06F 40/56
2023/0297771 A1 9/2023 Peleg et al.
2023/0351102 A1 11/2023 Tran
2023/0359903 A1 11/2023 Cefalu et al.
2024/0193350 A1 * 6/2024 Xie ........................ G06N 20/00
2025/0238677 A1 * 7/2025 Song .................... G06N 3/0475

FOREIGN PATENT DOCUMENTS

CN 115269821 A 11/2022
CN 116992854 A 11/2023
WO 2022221603 A1 10/2022
WO WO-2024114659 A1 * 6/2024 ............ G06F 16/00

OTHER PUBLICATIONS

Kikuchi, Yuta, et al. “Controlling output length in neural encoder-decoders.” arXiv preprint arXiv:1609.09552 (2016). (Year: 2016).*

(Continued)

*Primary Examiner* — Brian L Albertalli
(74) *Attorney, Agent, or Firm* — Christopher Storms; Brooks Kushman P.C.

(57) ABSTRACT

A computer that includes a processor and a memory, the memory including instructions executable by the processor to receive a prompt for a large language model, the prompt including an input text and a target length. The large language model can generate an output text that includes a number of words equal to the target length within a user determined tolerance based on a length guidance embedding vector that encodes the target size.

20 Claims, 7 Drawing Sheets

(56) References Cited

OTHER PUBLICATIONS

Liu, Yizhu, Qi Jia, and Kenny Zhu. "Length control in abstractive summarization by pretraining information selection." Proceedings of the 60th Annual Meeting of the Association for Computational Linguistics (vol. 1: Long Papers). 2022. (Year: 2022).*
Yu, Zhongyi, et al. "Lenatten: An effective length controlling unit for text summarization." arXiv preprint arXiv:2106.00316 (2021). (Year: 2021).*
Takase, Sho, and Naoaki Okazaki. "Positional encoding to control output sequence length." arXiv preprint arXiv:1904.07418 (2019). (Year: 2019).*
Nguyen, Ngoc-Khuong, et al. "AMethod of Integrating Length Constraints into Encoder-Decoder Transformer for Abstractive Text Summarization." Intelligent Automation & Soft Computing 38.1 (2023). (Year: 2023).*
Miculicich, Lesly, et al. "Summarization with precise length control." arXiv preprint arXiv:2305.05171 (2023). (Year: 2023).*
Oka, Y. et al., "Incorporating Noisy Length Constraints into Transformer with Length-aware Positional Encodings," Proceedings of the 28th International Conference on Computational Linguistics, Dec. 8-13, 2020, 6 pages.
Sho T. et al., "Positional Encoding to Control Output Sequence Length." arXiv:1904.07418v1 [cs.CL] Apr. 16, 2019, 6 pages.
"What is a Summarizing Tool?," Repostseo, 2024, 8 pages.

* cited by examiner

LENGTH-BASED LARGE LANGUAGE MODELS

BACKGROUND

Computers can include instructions to perform useful data transformations. A class of computer instructions that can perform a large variety of useful data transformations include large language model (LLM) neural networks. An LLM can be trained based on massive natural language datasets to receive as input natural language queries and output responses to the queries.

An LLM is a software program that can be trained on massive amounts of data to receive as input a natural language query or prompt and output a response. The response can be in the same natural language as the query, a different natural language, or a structured language such as a regular grammar or computer programming language. Am LLM can be trained using a vast number, e.g., millions, of examples. In some examples the response can mimic a natural language response of a human closely enough that a trained LLM can be commonly regarded as artificial intelligence (AI). In other examples, a result output by a trained LLM in response to a natural language query can include a structured language such as a regular grammar or computer language that equals or exceeds the capabilities of a human user.

Training an LLM can be accomplished by passing training data through the LLM and comparing the result to a desired result, called ground truth. In some examples the ground truth can be derived from the input data. The LLM encodes the input training data into latent variables and then decodes the latent variables to reconstruct a natural language passage based on parameters. The parameters are updated based on comparing the output of the LLM to the input data to minimize the difference. In examples, the massive amount of training data can be acquired by scanning the Internet for examples of natural language that include samples of the targeted natural language. The training dataset can include news articles, books, social media posts, and technical articles for example.

DETAILED DESCRIPTION

Figure 1:
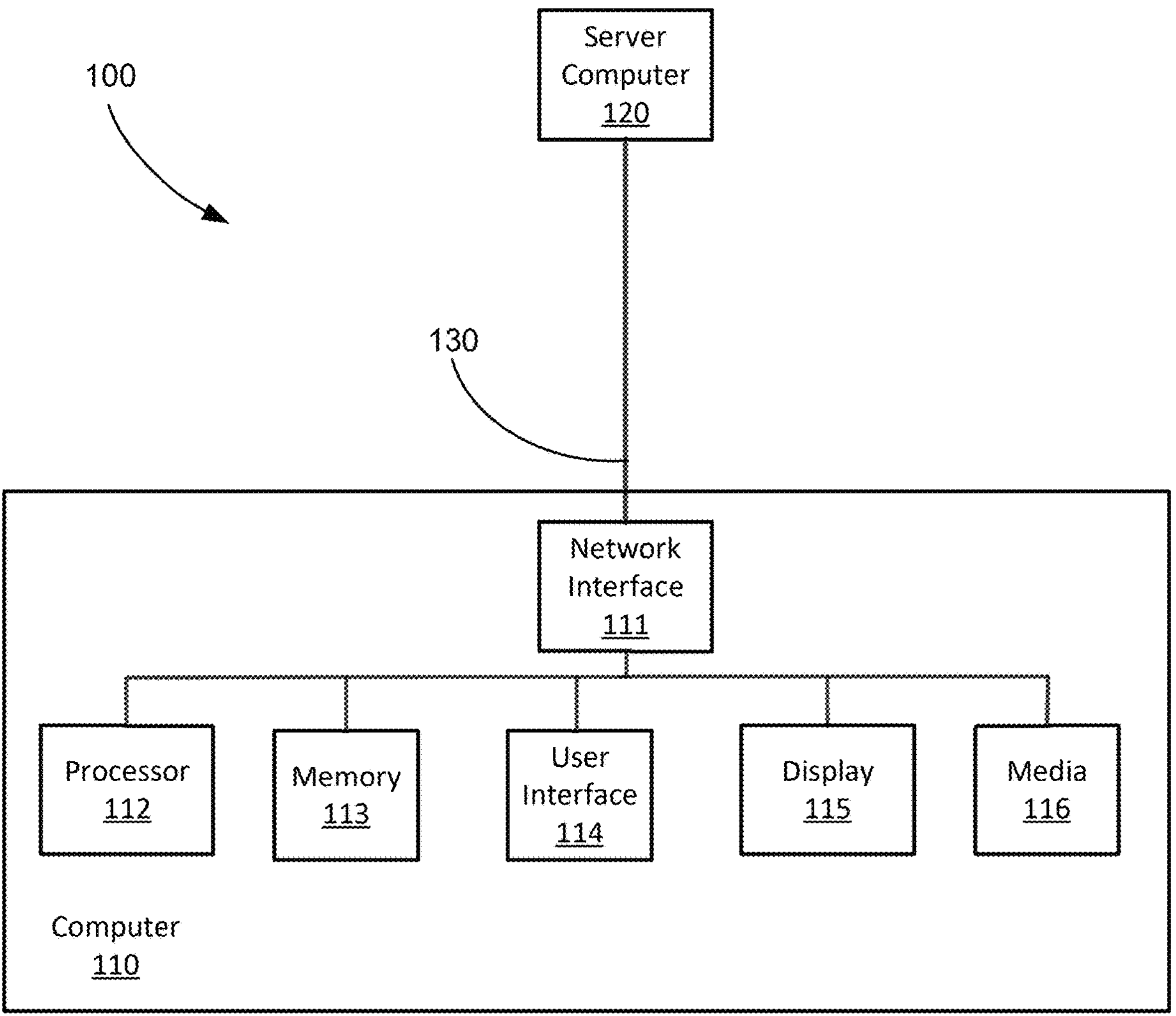
FIG. 1 is a block diagram of an example computer system.

This disclosure encompasses training and operating an LLM. An LLM can input queries in text format, referred to herein as prompts, and output responses in text format. Prompts can include requests for responses in virtually any information domain imaginable. Examples of LLM queries include requests for information or histories on government agencies, sports teams, or fictional characters. Options included in input prompts, for example temperature, can control LLM output to be more random or more deterministic. Another option can include directions to set the size of text strings output by an LLM. While training an LLM to provide output text is relatively easy, getting the LLM to output a specific number of words in response to an input prompt can be more difficult. Training an LLM to output text that includes a specific number of words can require additional training of the LLM with a large number of examples that include ground truth with the desired number of words. Even with this extra training the output from the LLM can vary widely from the number of words of output requested in a prompt.

An example of LLM use is providing summaries of input text. Providing summaries of input text that reduce the number of words relative to the input text while retaining relevant information from the input text is a useful operation that can be performed by an LLM. Producing summaries of input text that include a specified number of words is a desirable result in several applications, for example news summaries or tables of contents. Summarizing input text will be used herein as a non-limiting example of LLM processing.

Most LLMs are based on a transformer architecture. A transformer-based LLM is described in relation to FIG. 2, below. Unless explicitly stated otherwise, a reference herein to an LLM is a reference to a transformer-based LLM. LLMs can receive as input both data and commands. Input to an LLM, which can include both data and commands, can be referred to as a prompt. Prompts are input to an LLM to generate a result. For example, a prompt can cause an LLM to generate a summary of a text document, and can include the text document, and could include a command such as "summarize the following document in one sentence," or "summarize the following document in 20 words." In general, an LLM can receive extensive training with example prompts that include sample input data and the input command to produce usable output. Even with extensive training, the results tend to vary widely and the LLM can require retraining for each newly specified summary length. Techniques described herein can enhance generation of text summaries by LLM processing by modifying an LLM by adding a length guidance vector. Modifying an LLM by adding a length guidance vector can generate output text summaries that accurately include a specified number of words while requiring less training, e.g. fewer computer resources, than an unmodified LLM. Length guidance vectors can be generated based on a target length included in an input prompt. LLM output that is more accurate and/or reliable, and/or not previously possible, can be obtained. Length guidance vectors are described in relation to FIGS. 4-6, below.

Disclosed herein is a method including receiving a prompt for a large language model, the prompt including an input text and a target length and generating, in the large language model, an output text that includes a number of words equal to the target length within a user determined tolerance based on a length guidance vector that encodes the target length. The input text can include more words than the target length and the output text is based on the input text. the input text can be received by a tokenizer that generates tokens that represent words in the input text. The large language model can include an embedding block that includes an array that includes token vectors and a position vector that encodes the position of the token vectors in the array. A decoder can generate the length guidance vector. The length guidance vector can encode the target length by determining a scalar multiple starting at zero at an origin of the length guidance vector and ending at one at an entry equal to the target length and sets a remainder of entries in the length guidance vector to zeros. The length guidance vector can encode the target length by determining a scalar multiple equal to a sinusoidal function starting at zero at an origin of the length guidance vector, having a value of one an entry equal to one-half the target length, and returning to 0 at the entry equal to the target length and setting a remainder of entries in the length guidance vector to zeros.

The large language model can receive as input a first target length and a second target length indicating a range of target lengths and the large language model is modified to include a first length guidance vector and a second length guidance vector. The first length guidance vector can include a first sinusoidal function which determines a scalar multiple beginning at an origin of the first length guidance vector at zero, rises to one at one-half the first target length and falls to zero at the first target length and sets a remainder of entries in the first length guidance vector to zeros. The second length guidance vector can include a second sinusoidal function which determines a scalar multiple beginning at an origin of the second length guidance vector at zero, rises to one at one-half the second target length and falls to zero at the second target length and sets a remainder of entries in the second length guidance vector to zeros. The first length guidance vector can be added to the second length guidance vector. The user determined tolerance can be selected by the user and determined during training of the large language model and is configurable at inference time. The user determined tolerance can be determined by training the large language model. The large language model can be based on a transformer architecture.

Further disclosed is a computer readable medium, storing program instructions for executing some or all of the above method steps. Further disclosed is a computer programmed for executing some or all of the above method steps, including a computer apparatus, programmed to receiving a prompt for a large language model, the prompt including an input text and a target length and generating, in the large language model, an output text that includes a number of words equal to the target length within a user determined tolerance based on a length guidance vector that encodes the target length. The input text can include more words than the target length and the output text is based on the input text. the input text can be received by a tokenizer that generates tokens that represent words in the input text. The large language model can include an embedding block that includes an array that includes token vectors and a position vector that encodes the position of the token vectors in the array. A decoder can generate the length guidance vector. The length guidance vector can encode the target length by determining a scalar multiple starting at zero at an origin of the length guidance vector and ending at one at an entry equal to the target length and sets a remainder of entries in the length guidance vector to zeros. The length guidance vector can encode the target length by determining a scalar multiple equal to a sinusoidal function starting at zero at an origin of the length guidance vector, having a value of one an entry equal to one-half the target length, and returning to 0 at the entry equal to the target length and setting a remainder of entries in the length guidance vector to zeros.

The instructions can include further instructions wherein the large language model can receive as input a first target length and a second target length indicating a range of target lengths and the large language model is modified to include a first length guidance vector and a second length guidance vector. The first length guidance vector can include a first sinusoidal function which determines a scalar multiple beginning at an origin of the first length guidance vector at zero, rises to one at one-half the first target length and falls to zero at the first target length and sets a remainder of entries in the first length guidance vector to zeros. The second length guidance vector can include a second sinusoidal function which determines a scalar multiple beginning at an origin of the second length guidance vector at zero, rises to one at one-half the second target length and falls to zero at the second target length and sets a remainder of entries in the second length guidance vector to zeros. The first length guidance vector can be added to the second length guidance vector. The user determined tolerance can be selected by the user and determined during training of the large language model and is configurable at inference time. The user determined tolerance can be determined by training the large language model. The large language model can be based on a transformer architecture.

FIG. 1 is a diagram of an example computing system 100. Computing system 100 includes a computer 110, and a server computer 120 remote from the computer 110. One or more computers 110 can receive data regarding the operation of the computer 110 from a user interface 114. The computer 110 may also operate based on data received from the remote server computer 120. The server computer 120 can communicate with the computer 110 via a network 130 and network interface 111.

Computer 110 includes a processor 112 and a memory 113 such as are known. Further, memory 113 includes one or more forms of computer-readable media, and stores instructions executable by the processor 112 for performing various operations, including as disclosed herein. The computer 110 may include or be communicatively coupled to, i.e., via a communications bus as described further below, more than one computing devices, i.e., controllers or the like included in the computing system 100 for monitoring and controlling various components. The computer 110 network can additionally or alternatively include wired or wireless communication mechanisms such as are known, i.e., Ethernet or other communication protocols.

In addition, the computer 110 may be configured for communicating through a network interface 111 with a remote server computer 120, i.e., a cloud server, via a network 130, which, as described below, includes hardware, firmware, and software that permits computer 110 to communicate with a remote server computer 120 via a network 130 via wired and/or wireless protocols or arrangements. Network interface 111 may accordingly include processors, memory, transceivers, etc., configured to utilize various wired and wireless networking technologies, i.e., cellular, WI-FI®, BLUETOOTH®, Bluetooth Low Energy (BLE), Ultra-Wideband (UWB), Peer-to-Peer communication, UWB based Radar, IEEE 802.11, and other wired and wireless packet networks or technologies. The computer 110 also includes nonvolatile media 116, such as is known. Computer 110 can log data by storing the data in nonvolatile media 116 for later retrieval and transmittal via the vehicle communication network and a vehicle to network interface 111 to a server computer 120. Nonvolatile media 116 can also be removable for archival storage or transport to another computer 110.

As already mentioned, generally included in instructions stored in memory 113 and executable by processor 112 of the computer 110 are software programs. For example, the computer 110 may include programming to operate one or more software programs such as a neural networks. Using data received in the computer 110, i.e., input data from the user interface 114, the server computer 120, etc., the computer 110 may make various determinations and output data via display 115 or network interface 111. Under interface 114 can include input devices such as a keyboard, pointing devices such as a mouse or trackpad, a scanner, a camera, etc. Output data can also be transmitted to non-volatile media 116 such as disk drives, flash drives, memory cards or printers, etc.

Server computer 120 typically has features in common, e.g., a computer processor and memory and configuration for communication via a network 130, with the vehicle 110 V2I interface 111 and computer 110, and therefore these features will not be described further to reduce redundancy. A server computer 120 can be used to develop and train machine learning software that can be transmitted to a computer 110.

Figure 2:
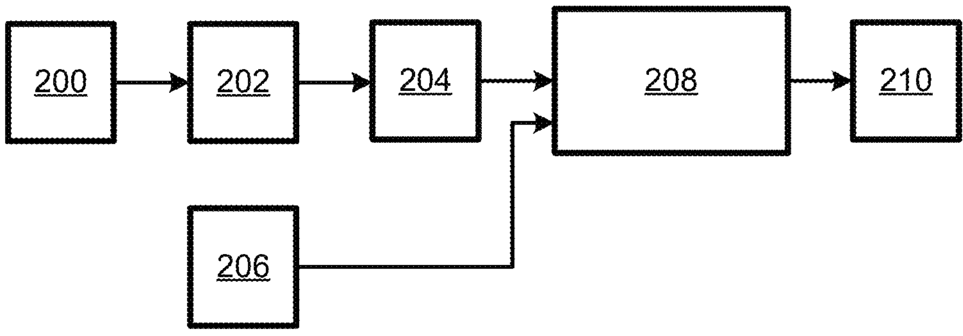
FIG. 2 is a diagram of an example LLM transformer architecture layer.

FIG. 2 is a diagram of an example LLM 208. Table 1 includes a sample text document 200 to be tokenized by tokenizer 202 for input to LLM 208:

TABLE 1

| Sample text document 200. |
| --- |
| text = """"Call me Ishmael. Some years ago-never mind how long precisely-having little or no money in my purse, and nothing particular to interest me on shore, I thought I would sail about a little and see the watery part of the world. It is a way I have of driving off the spleen and regulating the circulation. Whenever I find myself growing grim about the mouth; whenever it is a damp, drizzly November in my soul; whenever I find myself involuntarily pausing before coffin warehouses, and bringing up the rear of every funeral I meet; and especially whenever my hypos get such an upper hand of me, that it requires a strong moral principle to prevent me from deliberately stepping into the street, and methodically knocking people's hats off-then, I account it high time to get to sea as soon as I can. This is my substitute for pistol and ball. With a philosophical flourish Cato throws himself upon his sword; I quietly take to the ship. There is nothing surprising in this. If they but knew it, almost all men in their degree, some time or other, cherish very nearly the same feelings towards the ocean with me. |
| There now is your insular city of the Manhattoes, belted round by wharves as Indian isles by coral reefs-commerce surrounds it with her surf. Right and left, the streets take you waterward. Its extreme downtown is the battery, where that noble mole is washed by waves, and cooled by breezes, which a few hours previous were out of sight of land. Look at the crowds of water-gazers there. |
| Circumambulate the city of a dreamy Sabbath afternoon. Go from Corlears Hook to Coenties Slip, and from thence, by Whitehall, northward. What do you see?-Posted like silent sentinels all around the town, stand thousands upon thousands of mortal men fixed in ocean reveries. Some leaning against the spiles; some seated upon the pier-heads; some looking over the bulwarks of ships from China; some high aloft in the rigging, as if striving to get a still better seaward peep. But these are all landsmen; of week days pent up in lath and plaster-tied to counters, nailed to benches, clinched to desks. How then is this? Are the green fields gone? What do they here?"""" |

Text document 200 included in Table 1 can be converted into a token vector list 204 that includes token vectors to be stored in variable "inputs" by tokenizer 202. An example tokenizer 202 command including tokenizer 202 parameters is included in Table 2. Tokenizer 202 can include a table or tables or the like that can associate input words with numerical values included in a token vector; the LLM 208 can then recognize numerical values specified in the token vectors as the corresponding original words. Handling words as token vectors is a more efficient way of processing text than storing and moving text strings. The tokenizer 202 takes as input a text string which can be the text document 200 included in Table 1, and parameters that determine the format of the output token vector list 204, labeled "input" because it becomes input to the LLM 208. Following the tokenizer 202 command the print statement prints the number of tokens included in the "input" variable on the next line.

TABLE 2

| Tokenizer 202 instructions. |
| --- |
| inputs = tokenizer(text, return_tensors="pt" , padding=True, truncation=True) |
| print( f"Input Tokens: {inputs[ ' input_ids']. shape[l]} ") |
| Input Tokens: 385 |

Following tokenizer 202, token vector list 204 that includes token vectors corresponding to the input text document 200 is input to the LLM 208 along with a target length 206. Each token in token vector list 204 is a vector. Table 3 illustrates a loop inputs the token vector list 204 and target length 206 to LLM 208 three times to generate three output summaries 210 for three target lengths 206 that include 75, 100 and 125 words. A token vector list 204 of text document 200 and a target length 206 are input to LLM 208. LLM 208 is labeled as a command named "model.generate" in Table 3 and takes an token vector list 204 of text document 200 and target length 206 as parameters "target_tokens=target" in line 2 of Table 3. LLM 208 produces an output summary 210 as a variable labeled "outputs" as tokens. The tokens in "outputs" are converted into words in a variable labeled "result" by the tokenizer 202 executing a tokenizer.batch_decode command. The tokenizer 202 can also return the number of words in "outputs" in a variable labeled "results_len." The print commands in lines 4-6 of Table 3 print the output summary, the target length 206 and the actual number of words included in the output summary 210 returned by LLM 208.

TABLE 3

Input to LLM 208.

```
for target in [ 75, 100, 125]:
  outputs = model.generate(**inputs, target__tokens=target)
  result = tokenizer.batch__decode(outputs, skip__special__tokens=True)[0]
  result__len = tokenizer(result, return__tensors="pt", padding=True, truncation=True)
    ["input__ids"].shape[1]
  print(f'Target Tokens: {target}")
  print(f'Generated Tokens : {result__len}" )
  print(f'Summary: {result}\n" )
```

Output summaries 210 for the three target lengths 206 in Table 3 are illustrated in Tables 4. The target lengths 206 are labeled "Target Tokens," the number of tokens (words) generated by the LLM 208 are labeled "Generated Tokens" and the output summaries 210 are labeled "Summary." The number of generated tokens included in the output text summaries 210 are different from the target lengths 206 because the LLM 208 has been trained to complete a grammatically correct sentence that yields an output summary 210 that includes a number of words that is within a user selected percentage of the target length 206, plus or minus. For example, the first summary 210 is 2.7% less than the target of 75 words, the second summary 210 is 3% more than the target of 100 words, and the third summary is 4.8% greater than the target length 206 of 125 words. The user determined tolerance can be selected by the user and determined during training of the large language model and is configurable at inference time.

TABLE 4

Output summaries 210, target lengths 206 and actual lengths.

Target Tokens: 75
Generated Tokens: 73
Summary: Some years ago, Ishmael had no money and decided to sail about and see the watery part of the world. Whenever Ishmael grows grim, he accounts it time to go to sea. He thinks all men feel the same way about the sea as he does. When he goes about the city on a Sunday, he sees thousands of men looking out to sea. These are all landsmen, tied to counters and desks.
Target Tokens: 100
Generated Tokens: 103
Summary: Years ago, Ishmael had no money and nothing to interest him on land. He decided to sail about and see the watery part of the world. Whenever Ishmael grows grim about the mouth, he accounts it time to go to sea. The city is surrounded by wharves, and right and left the streets take you waterward. There is nothing surprising about this. He thinks all men feel the same way about the sea as he does. When he goes about the city on a Sunday, he sees thousands of men looking out to sea. These are all landsmen, tied to counters and desks.
Target Tokens: 125
Generated Tokens: 131
Summary: Some years ago, Ishmael had no money and nothing to interest him on land. He decided to sail about and see the watery part of the world. Whenever Ishmael grows grim about the mouth, and whenever it requires a strong moral principle to prevent him from deliberately stepping into the streets and methodically knocking people's hats off, he accounts it time to go to sea. The city is surrounded by wharves, and right and left the streets take you TABLE 4-continued

| Output summaries 210, target lengths 206 and actual lengths. |
| --- |
| waterward. There is nothing surprising about this. He thinks all men feel the same way about the sea as he does. When he goes about the city on a Sunday, he sees thousands of men posted like silent sentinels, looking out to sea. These are all landsmen, tied to counters and desks. |

Figure 3:
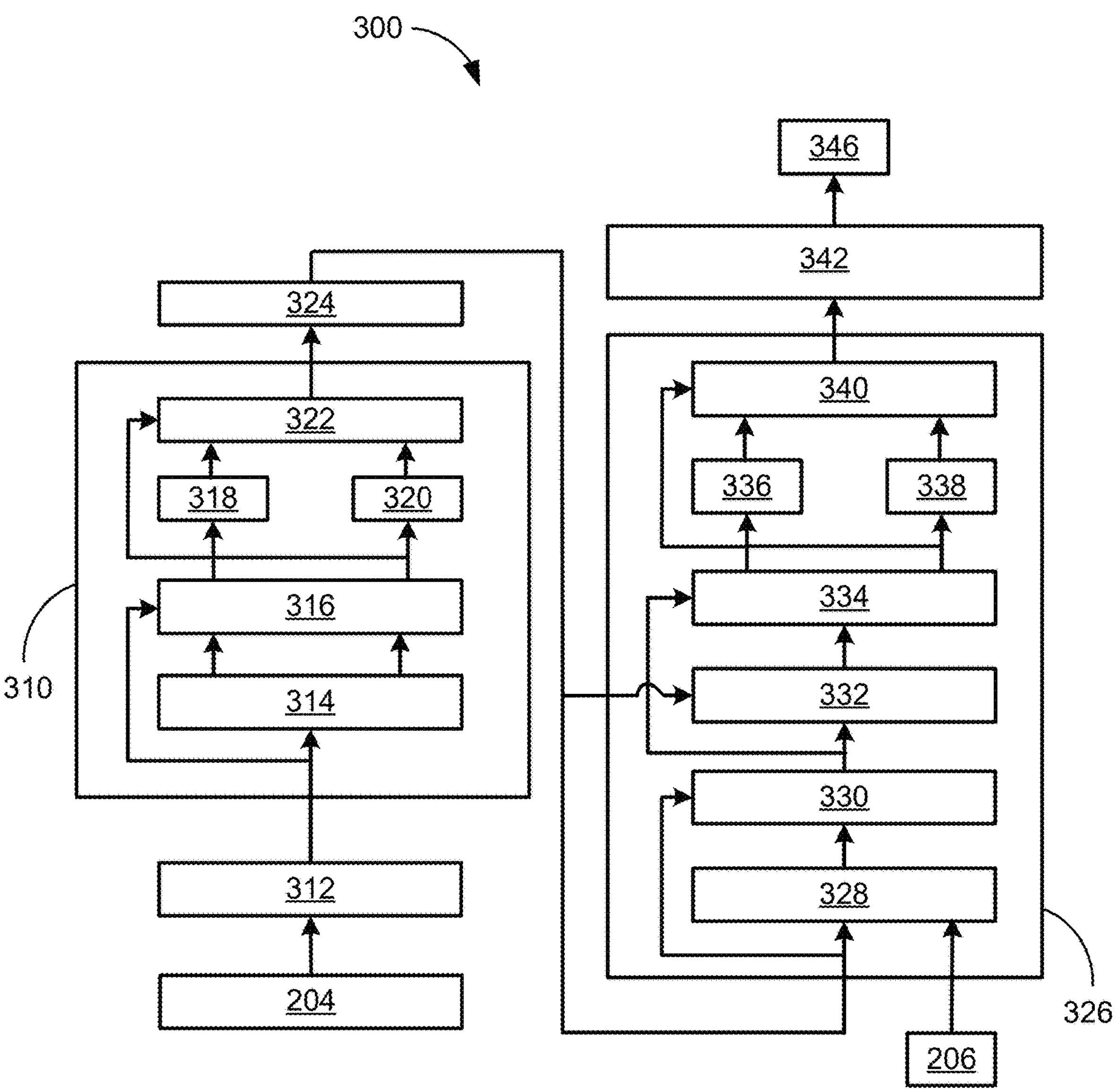
FIG. 3 is a diagram of an example LLM.

FIG. 3 is a diagram of an example transformer-based LLM 300 neural network. A transformer neural network can be used to implement an LLM 300 to handle large amounts of training data efficiently. Training a transformer neural network can result in a large number of parameters being stored for recall at inference time. An LLM 300 is a type of neural network optimized for processing sequential data such as natural language An LLM 300 an attention-based sequence-to-sequence encoder-decoder architecture that can input natural language text, execute instructions included in the input text and output text. Attention-based architectures can process long-range dependencies, where results can be based on words or phrases that are distant from each other in the input data. Attention-based architectures are also good at determining context, where context is defined as underlying circumstances that affect a result output from an LLM 300. Context can be determined based on more than one portion of a sequence input to an LLM 300.

Transformer-based LLM 300 neural networks are described in "Attention Is All You Need," Asish Vaswani, Noam Shazeer, Niki Parmar, Jakob Uszkoreit, Llion Jones, Aidan N. Gomez, Lukasz Kaiser, Illia Polosukhin, $31^{st}$ Conference on Neural Information Processing Systems, (NIPS 2017), Long Beach, CA. Techniques described herein modify the transformer-based LLM 300 neural networks by adding a target length 206 which can be applied to an output sequence. A length guidance vector based on the target length 206 can be repeated for the length of an output sequence and scaled based on the current position.

In an example of a linear length guidance vector, scale_fn (i) determines a scalar multiple for the vector in the array of vectors included in LLM decoder 326 at position i. The decoder vector array included in an LLM decoder 326 determines a scalar multiple for each vector token in the array because the vector is repeated such that there is one vector per token in the sequence. The remainder of the elements of length guidance vector 412, which has a total length equal to the length of the token array and the position vector 410, are set equal to zero. An example linear function for determining scale_fn(i) is illustrated in equation (1):

$$\text{scale\_fn}(i) = (1/\text{len\_guid\_emb}) * i\{i \le \text{len\_guid\_emb},\ 0 \text{ otherwise}\} \tag{1}$$

Where len_guid_emb is the target length 206. Additional functions that can indicate the values of elements of the length guidance vector 412 are described in relation to FIGS. 5 and 6.

A transformer-based LLM 300 can efficiently be trained using very large datasets. For example, an LLM 300 can produce results efficiently by sampling portions of intermediate results generated by the LLM 300. Differences in sampling between one run of an LLM 300 to the next can cause an LLM 300 to be non-deterministic, meaning that an LLM 300 can produce different results for more than one run based on the same input prompt. Although the design of an LLM 300 is such that strictly deterministic behavior is sometimes not possible, careful prompt design can yield results that are close enough to be useable for the desired purpose without being identical. A close result is a result that indicates the same meaning while being expressed with slightly different wording.

A technique for producing repeatable results is to perform multiple LLM 300 runs to generate multiple results for a single prompt. Obtaining these results can be compared using a voting algorithm, where the most frequently occurring response is selected. The more detailed and specific examples that are included in a prompt, the more likely similar results will be output for repeated applications of the prompt. The more detailed and specific the input prompts, the less variation in output results will be produced by a trained LLM 300. Techniques described herein for modifying an LLM 300 provide enhancements to generating summaries from input text documents by adding a length guidance vector can reduce the variance in output summaries.

LLM 300 is a transformer-based neural network architecture that includes attention-based processing to efficiently process large input texts. Attention-based processing can encode text as numerical tokens in a token vector list 204 that includes an entry for each word in the input text. Embedding block 312 can form an array of token vectors for processing by the LLM 300 by adding positional encoding to the token vector list 204 to input to LLM 300 for processing. Embedding block 312 and positional encoding are described in relation to FIG. 4, below.

LLM 300 processing begins with receiving an array of token vectors from embedding block 312 in a first decoder block 310 of LLM 300. Embedding block 312 is described in relation to FIG. 4, below. An LLM 300 can include multiple encoder blocks 310 followed by multiple decoder blocks 326. Encoder blocks 310 include multiple layers which determine relationships between tokens extracted from the human-readable text document in token vector list 204 based on parameters determined at training time. The processed token vector can be output by one or more encoder blocks 310 as latent variables 324, so-called because the latent variables 324 are not typically visible to a user or used outside of the LLM 300. The latent variables 324 are then processed by one or more decoder blocks 326, which process the tokens and relationships included in the latent variables 324 to generate an output token summary 346. The output token summary 346 can be input to tokenizer 302 with appropriate parameters as illustrated in Table 3, above to generate human-readable text that includes target length 306 words, plus or minus a user determined percentage.

The positionally encoded vector output by embedding block 312 is received by multi-head attention layer 314. Multi-head attention layer 314 is a self-attention processing layer that generates multiple intermediate results in parallel. Multi-head attention layer 314 permits an LLM 300 to determine results based on multiple intermediate results in a single pass. Generating prompts that emphasize relationships between words in input text, provides context by describing relationships between words and generates multiple intermediate results can enhance processing efficiency of an LLM 300 and reduce the effect of non-deterministic behavior of an LLM 300.

Self-attention processing by multi-head attention layer 314 can determine relationships between the tokens in input vector without additional external data. The weights or parameters included in training data for LLM 300 can determine relationships and scores for the relationships between the tokens. Multi-head attention layer 314 can determine multiple relationships and scores between multiple groups of input tokens in the same pass. Multi-head attention layer 314 outputs the relationships and scores to add and normalize layer 316 where each of the relationships and scores are separately added to the positionally encoded vector and normalized to keep the numeric values of intermediate processing results internal to the LLM 300 within preset limits. This normalization is performed based on mean and variance values accumulated over the entire training dataset, thereby forcing results to stay within a defined range of values. Normalization can reduce or prevent unwanted results from skewing the training data, which helps the training converge more quickly on valid results.

The respective multi-head outputs from add and normalize layer 316 are input to multiple feed forward networks 318, 320, where the normalized results are processed in parallel. Feed forward networks 318, 320 are fully connected neural networks that calculate linear and/or non-linear functions based on the input normalized vector data. The output from the feed forward networks 318, 320 is combined with output from the first add and normalize layer 316 at a second add and normalize layer 322. The operation of the second add and normalize layer 322 is the same as described above in relation to the first add and normalize layer 316, where the results are normalized to a selected range to inhibit unwanted results and enhance training.

Encoder block 310 outputs a latent vector 324 to either a subsequent encoder 310 or to a first decoder block 326. In examples of LLM 300 modified as described herein, target length 306 can be input to decoder block 326. Target length encoding is described in relation to FIGS. 5-6, below. In examples, target length can be modified to include a start length and a stop length that describes a range of possible lengths for the output token summary 346 rather than a single target length 206. Upon exiting the final encoder 310, decoder block 326 receives the latent vector 324 at the first decoder attention layer 328 which flattens the input latent vector 324 to compact the number of connections that relate tokens included in latent vector 324. Following the first decoder attention layer 328, first decoder add and normalize layer 330 normalizes the flattened vector data as discussed above to again permit rapid convergence of results during training. Following the first decoder add and normalize layer 330, second multi-head encoder-decoder attention layer 332 combines latent vector 324 with flattened vector output from first add and normalize layer 330. Output from second multi-head encoder-decoder attention layer 332 is input to second decoder add and normalize layer 334 and then to multiple feed forward networks 336, 338 to process each portion of the flattened vector data in parallel. Feed forward networks 336, 338 are fully connected neural networks that calculate linear and/or non-linear functions based on the input flattened vector data. Following the feed forward networks 336, 338 a third decoder add and normalize layer 340 normalizes the output from the feed forward networks 336, 338 as discussed above.

LLM 300 can include multiple decoder blocks 326 (one block 326 being shown in FIG. 3 by way of example). Following a final decoder block 326, LLM 300 can include a linear layer 342 which takes as input the flattened vector data output by the final decoder block 326. Linear layer 342 includes a fully connected neural network that translates the flattened vector data output by the final decoder block 326 into output token summary 346 for final output. LLM 300 can execute as a software program installed as instructions in memory 113 of a computer 110. LLM 300 can also be executed as a software program in server computer 120. Input text document 200 can be received via user interface 114 or via network interface 111 from a server computer 120. The server computer 120 can be included in a networking system such as the Internet, for example.

A trained LLM 300 can be installed in a computing device where the LLM 300 can be operated to generate useful output text. Operating a trained LLM 300 can include providing the LLM 300 with a prompt. A prompt is a text file that includes instructions and data, for example a token vector list 204 and a target length 206 that determine the processing that will be performed by the LLM 300. The summary text 346 that will be output from the LLM 300 following processing is based on the contents of the prompt received by the LLM 300.

Figure 4:
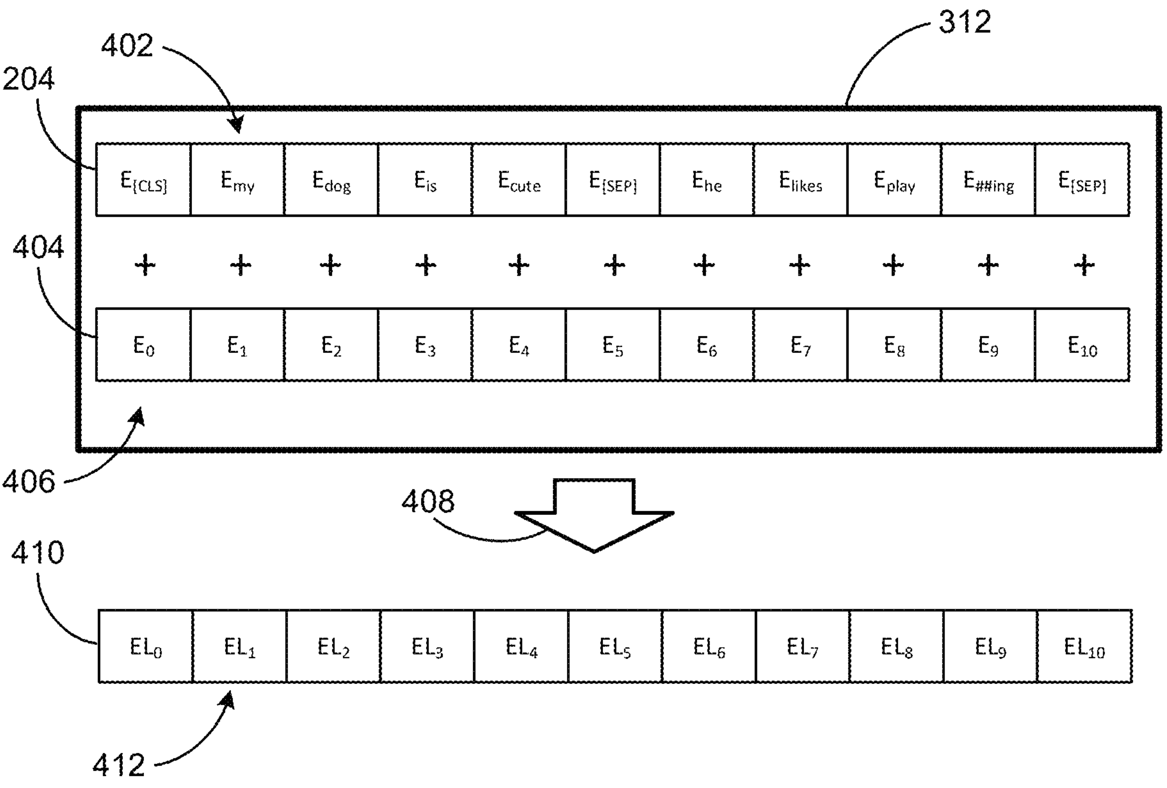
FIG. 4 is a diagram of example input embedding vectors.

FIG. 4 is a diagram of an example embedding block 312. Embedding block 312 receives as input a token vector list 204 generated from a text document 200 by tokenizer 202. Each element 402 of token vector list 204 is a token vector. Embedding block 312 adds the token vector list 204 to position vectors 404, where each element 406 of position vectors 404 is a vector. Embedding block 312 outputs 408 positionally encoded vectors 410 in which each element is a vector.

Figure 5:
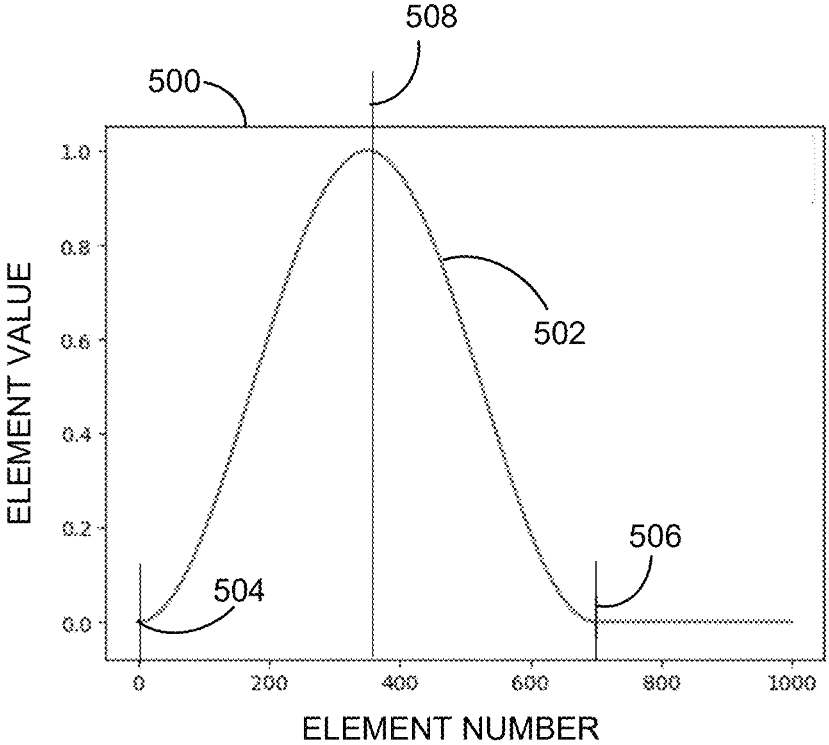
FIG. 5 is a diagram of example sinusoidal length guidance embedding.

FIG. 5 is a diagram of an example graph 500 of a sinusoidal function 502 that can be used to determine the values of elements of a length guidance vector that can replace the linear function described in relation to FIG. 3 scale_fn(i) determines a scalar multiple for the entire decoder vector in the list of vectors included in LLM decoder at position i. In some examples, replacing a linear function with a sinusoidal function 502 in a length guidance vector in a decoder 326 can enhance the ability of an LLM 300 to generate an output text summary 346 of an input text document 200. Sinusoidal functions 502 can be effective when the target length 206 exceeds 300 words, for example. An example sinusoidal function that can replace the linear function of equation (1) is illustrated in equation (2):

$$\text{scale\_fn}(i)=\sin\left(\left(\pi/2\text{len\_guid\_emb}\right)*i\right)\{i\le\text{len\_guid\_emb},\ 0\ \text{otherwise}\} \quad (2)$$

Where len_guid_emb is the target length 206.

Figure 6:
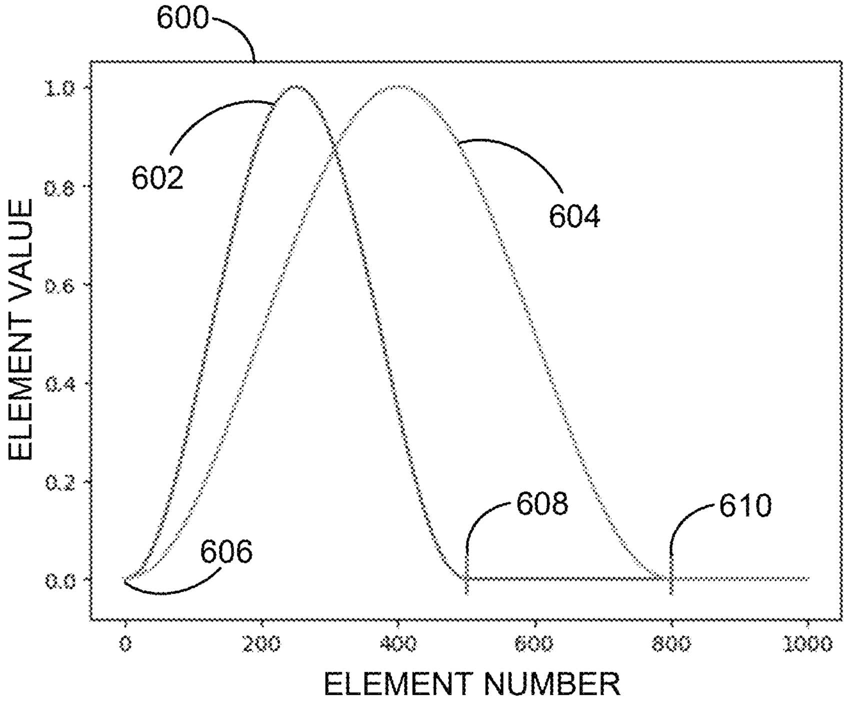
FIG. 6 is a diagram of example sinusoidal range length guidance embedding.

Graph 500 illustrates a sinusoidal function 502 by graphing element numbers on the x-axis versus element values on the y-axis. Sinusoidal function 502 starts at element number 504 zero with element value zero, rising to element value one at element number 508 equal to one-half the target length 206 and falling to element value zero at element value 506 equal to the target length 206. Length guidance vector, scale_fn(i) determines a scalar multiple for the entire decoder vector in the list of vectors included in LLM decoder at position i. FIG. 6 is a diagram of an example graph 600 two sinusoidal functions 602, 604. Graph 600 illustrates two sinusoidal functions 602, 604 by graphing element numbers on the x-axis versus element values on the y-axis. Two sinusoidal functions 602, 604 to indicate a range of target lengths 208. In examples where a range of target lengths are used, a first target length indicates a starting value, and the second target length indicates and end value. In an input prompt, target range can be indicated by two target lengths 208 separated by a hyphen. LLM 300 can then generate an output token summary 346 that includes a number of words between first target length and second target length.

Target range can be inserted into a first length guidance vector by determining a first sinusoidal function 602 for a first target length 206 according to equation (3) which begins at entry 606 equal to the origin with element value zero, rising to element value one at the entry equal to one-half the first target length 206, and falling to element value zero at entry 608 equal to the first target length 206. The remaining elements of the first length guidance vector are set to zero. The second target length can be inserted into a second guidance vector by determining a second sinusoidal function 604 according to equation (3) which begins at entry 606 equal to the origin with element value zero, rises to element value one at an entry equal to one-half the second target length 206, and falling to element value zero at entry 610 equal to the second target length 206. The remining elements of the second guidance vector can be set to zero. The first sinusoidal function 602 and the second sinusoidal function 604 can be combined by pointwise addition.

Figure 7:
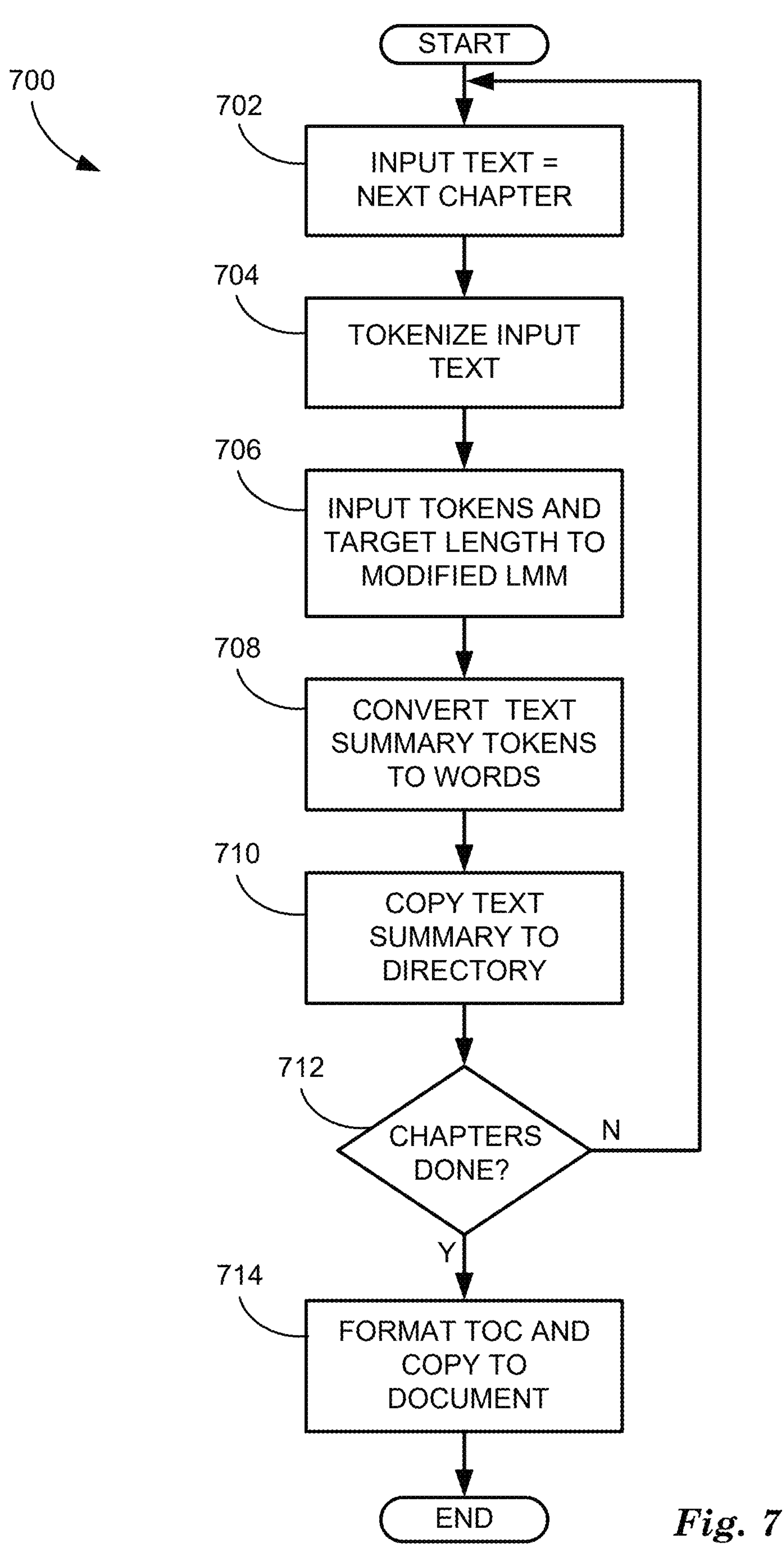
FIG. 7 is a flowchart diagram of an example process to generate text summaries based on an LLM and length guidance embedding.

FIG. 7 is a flowchart of a process 700 for generating text summaries of chapters of a document that includes multiple chapters. For example, each chapter of the document can potentially include 5,000 to 20,000 words. Each chapter can be summarized at a target length of 100 to 150 words with an LLM 300 modified to input prompts that include tokenized chapters as text documents 200 and target lengths 208 as described herein. The output text summaries 210 can be inserted into a table of contents included at the beginning of the document, for example. Process 700 can be implemented in a computer 110, or a combination of a computer 110 and a server computer 120, for example. Process 700 includes multiple blocks that can be executed in the illustrated order. Process 700 could alternatively or additionally include fewer blocks and can include the blocks executed in different orders.

Process 700 begins at block 702, where, starting with the first chapter, a computer 110 copies a next chapter of a document from the document into an input text document 200.

At block 704 the input text document 200 is input to tokenizer 202 to determine numerical tokens included in token vector list 204 that represent the words included in the text document 200 as described above in relation to FIGS. 2 and 3 and Tables 1 and 2.

At block 706 the tokenized text document 206 and a target length 206 is input to an LLM 300 modified to determine a length guidance vector based on the target length 206 and apply the length guidance vector to an output sequence. The LLM 300 then generates an output token summary 346 based on the input tokenized text document 206.

At block 708 output token summary 346 is input to tokenizer 202 with appropriate parameters to convert output token summary 346 from tokens to words. The words output from tokenizer 202 generate a text summary 210 that includes target length 206 words, plus or minus a user determined percentage of words.

At block 710 the text summary 210 is output to a software program that formats the output text summaries 210 as entries in a table of contents for the chapters of the document.

At block 712 computer 110 checks the document to determine whether any chapters remain to be summarized. If more chapters remain, process 700 returns to block 702 to copy the next chapter to input text document 200. If no more chapters remain, process 700 passes to block 714.

At block 714 a formatted table of contents from block 710 is inserted at the beginning of the research document to provide output of a table of contents that includes summaries of the chapters of the document. Following block 714 process 700 ends.

Computing devices such as those described herein generally each includes commands executable by one or more computing devices such as those identified above, and for carrying out blocks or steps of processes described above. For example, process blocks described above may be embodied as computer-executable commands.

Computer-executable commands may be compiled or interpreted from computer programs created using a variety of programming languages and technologies, including, without limitation, and either alone or in combination, Java™, C, C++, Python, *Julia*, SCALA, Visual Basic, Java Script, Perl, HTML, etc. In general, a processor (i.e., a microprocessor) receives commands, i.e., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (i.e., tangible) medium that participates in providing data (i.e., instructions) that may be read by a computer (i.e., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, i.e., a candidate to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system, comprising: a computer that includes a processor and a memory, the memory including instructions executable by the processor to:

receive a prompt for a large language model, the prompt including an input text and a target length wherein the large language model is modified by adding a length guidance vector; and generate, in the large language model, an output text that includes a number of words equal to the target length within a user determined tolerance based on the length guidance vector that encodes the target length.

2. The system of claim 1, wherein the input text includes more words than the target length and the output text is based on the input text.

3. The system of claim 1, the instructions including further instructions to receive the input text by a tokenizer that generates tokens that represent words in the input text.

4. The system of claim 1, wherein the large language model includes an embedding block that includes an array that includes token vectors and a position vector that encodes the position of the token vectors in the array.

5. The system of claim 1, wherein a decoder portion of the large language model generates elements of the length guidance vector based on the target length.

6. The system of claim 5, wherein the decoder portion of the large language model encodes the target length by determining a scalar multiple starting at zero at an origin of the length guidance vector and ending at one at an entry equal to the target length and sets a remainder of entries in the length guidance vector to zeros.

7. The system of claim 6, wherein the decoder portion of the large language model encodes the target length by determining a scalar multiple equal to a sinusoidal function starting at zero at an origin of the length guidance vector, having a value of one an entry equal to one-half the target length, and returning to 0 at the entry equal to the target length and setting a remainder of entries in the length guidance vector to zeros.

8. The system of claim 7, wherein the large language model receives as input a first target length and a second target length indicating a range of target lengths and the decoder portion of the large language model is modified to include a first length guidance vector and a second length guidance vector.

9. The system of claim 8, wherein the first length guidance vector includes a first sinusoidal function which determines a scalar multiple beginning at an origin of the first length guidance vector at zero, rises to one at one-half the first target length and falls to zero at the first target length and sets a remainder of entries in the first length guidance vector to zeros.

10. The system of claim 9, wherein the second length guidance vector includes a second sinusoidal function which determines a scalar multiple beginning at an origin of the second length guidance vector at zero, rises to one at one-half the second target length and falls to zero at the second target length and sets a remainder of entries in the second length guidance vector to zeros.

11. The system of claim 10, wherein the first length guidance vector is added to the second length guidance vector.

12. The system of claim 1, wherein the user determined tolerance is selected by the user and determined during training of the large language model and is configurable at inference time.

13. A method, comprising:

receiving a prompt for a large language model, the prompt including an input text and a target length wherein the large language model is modified by adding a length guidance vector; and generating, in the large language model, an output text that includes a number of words equal to the target length within a user determined tolerance based on the length guidance vector that encodes the target length.

14. The method of claim 13, wherein the input text includes more words than the target length and the output text is based on the input text.

15. The method of claim 13, further comprising receiving the input text by a tokenizer that generates tokens that represent words in the input text.

16. The method of claim 13, wherein the large language model includes an embedding block that includes an array that includes token vectors and a position vector that encodes the position of the token vectors included in the array.

17. The method of claim 13, wherein a decoder portion of the large language model generates elements of the length guidance vector based on the target length.

18. The method of claim 17, wherein the decoder portion of the large language model encodes the target length by determining a scalar multiple starting at zero at an origin of the length guidance vector and ending at one at an entry equal to the target length and sets a remainder of entries in the length guidance vector to zeros.

19. The method of claim 18, wherein the decoder portion of the large language model encodes the target length by determining a scalar multiple equal to a sinusoidal function starting at zero at an origin of the length guidance vector, having a value of one an entry equal to one-half the target length, and returning to zero at the entry equal to the target length and setting a remainder of entries in the length guidance vector to zeros.

20. The method of claim 13, wherein the large language model receives as input a first target length and a second target length indicating a range of target lengths and the decoder portion of the large language model is modified to include a first length guidance vector and a second length guidance vector.

* * * * *